US012129981B2

(12) United States Patent
Giraud

(10) Patent No.: US 12,129,981 B2
(45) Date of Patent: Oct. 29, 2024

(54) MOTOR VEHICLE DEVICE FOR LIGHTING THE ROAD

(71) Applicant: VALEO VISION, Bobigny (FR)

(72) Inventor: Sylvain Giraud, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/262,644

(22) PCT Filed: Jan. 28, 2022

(86) PCT No.: PCT/EP2022/052107
§ 371 (c)(1),
(2) Date: Jul. 24, 2023

(87) PCT Pub. No.: WO2022/162180
PCT Pub. Date: Aug. 4, 2022

(65) Prior Publication Data

US 2024/0110682 A1 Apr. 4, 2024

(30) Foreign Application Priority Data

Jan. 29, 2021 (FR) ...................................... 2100873

(51) Int. Cl.
*F21S 41/26* (2018.01)
*F21S 41/32* (2018.01)
*F21W 102/135* (2018.01)

(52) U.S. Cl.
CPC ............. *F21S 41/26* (2018.01); *F21S 41/321* (2018.01); *F21W 2102/135* (2018.01)

(58) Field of Classification Search
CPC ........ F21S 41/321; F21S 41/26; F21S 41/147; F21S 41/285; F21S 41/365; F21S 2/005; F21W 2102/135
See application file for complete search history.

(56) References Cited

U.S. PATENT DOCUMENTS 7,134,775 B2 * 11/2006 Oishi .................... F21S 41/148 362/545
7,934,861 B2 5/2011 Albou
(Continued)

FOREIGN PATENT DOCUMENTS

EP 1936260 A1 6/2008
EP 2708798 A1 3/2014
(Continued)

OTHER PUBLICATIONS

European Patent Office, International Search Report (with English translation) and Written Opinion of corresponding International Application No. PCT/EP2022/052107, dated Mar. 29, 2022.

*Primary Examiner* — Zheng Song
(74) *Attorney, Agent, or Firm* — Valeo Vision

(57) ABSTRACT

The invention relates to a motor vehicle lighting device that includes light module arranged adjacent to one another in a transverse direction of the lighting device, each light module includes a light source capable of emitting a light beam and a collector comprising a reflective surface. A common lens common to the light modules, configured to project the light beam reflected by the collector, the lens forms on the road an image of the reflective surface of the collector. The lighting device includes a plurality of printed circuits, each printed circuit supporting the light source of one of the light modules. The printed circuits are arranged in the device in a stepped arrangement extending in planes that are parallel to one another and the common lens extending in the transverse direction while being substantially inclined with respect to these planes.

20 Claims, 3 Drawing Sheets

(56) References Cited

U.S. PATENT DOCUMENTS

| | | | | |
|---|---|---|---|---|
| 8,752,991 | B2 | 6/2014 | Owada | |
| 9,134,000 | B2 | 9/2015 | de Lamberterie et al. | |
| 11,022,266 | B2 | 6/2021 | Hermitte et al. | |
| 11,280,464 | B2 | 3/2022 | Giraud | |
| 11,761,602 | B2 * | 9/2023 | Potter | F21S 43/239 362/518 |
| 2003/0198060 | A1 * | 10/2003 | Ishida | F21S 41/338 362/545 |
| 2005/0094413 | A1 * | 5/2005 | Sazuka | F21S 41/148 362/544 |
| 2012/0140508 | A1 * | 6/2012 | Owada | F21S 41/151 362/538 |
| 2018/0264993 | A1 * | 9/2018 | Takenaka | F21S 41/143 |
| 2018/0356060 | A1 * | 12/2018 | Kasano | F21S 41/322 |
| 2022/0205603 | A1 * | 6/2022 | Go | F21S 41/285 |
| 2023/0250932 | A1 * | 8/2023 | Inoue | F21S 41/321 362/516 |
| 2023/0383920 | A1 * | 11/2023 | Lee | F21S 43/15 |

FOREIGN PATENT DOCUMENTS

| | | | |
|---|---|---|---|
| EP | 3505814 | A1 | 7/2019 |
| EP | 3550203 | A1 | 10/2019 |
| EP | 3708904 | A1 | 9/2020 |
| FR | 3084728 | A1 | 2/2020 |

* cited by examiner

MOTOR VEHICLE DEVICE FOR LIGHTING THE ROAD

TECHNICAL FIELD

The subject matter of the invention is a lighting device for a motor vehicle.

The invention relates to the technical field of lighting devices for motor vehicles, and more specifically to stepped projection devices.

BACKGROUND OF THE INVENTION

In the field of motor vehicle lighting, it is generally known practice to use lighting devices comprising a plurality of light modules each comprising a light source, a collector with a reflective surface, the device comprising an optical projection system of lens type common to the plurality of light modules, the common lens imaging each of the reflective surfaces of the collectors to form a light beam having an upper cut-off. The type of lens used has a focal region usually positioned at the rear edges of the collectors, such that the upper cut-off of the light beam formed from the images of the reflective surfaces of the collectors by the lens is produced by these rear edges. This type of device makes it possible in particular to use thin lenses, having a significant focal length, in order to produce lighting devices that may have a complex esthetic appearance.

However, this type of device requires a greater number of modules in order to obtain sufficient illumination of the road. This constraint can be problematic when it is desired to have a lighting device with a vertically inclined lens, that is to say an inclination by rotation about an optical axis of the device, with respect to the overall orientation of the lighting device, in particular since the light source of each light module must necessarily uniformly illuminate the reflective surface of the collector and the common lens must collect all the light beam reflected by this collector while imaging the reflective surface.

It is an aim of the invention to propose a lighting device making it possible to produce a light beam from the projection of the images of the reflective surfaces of the collectors of a plurality of light modules by the same lens, whatever the vertical inclination of the lens.

SUMMARY OF THE INVENTION

The invention relates to a motor vehicle lighting device for lighting the road, comprising a plurality of light modules arranged adjacent to one another in a transverse direction of the lighting device, each light module comprising a light source capable of emitting a light beam and a collector comprising a reflective surface configured to collect and reflect the light beam emitted by said light source; a common lens which is common to the plurality of light modules, configured to project the light beam reflected by the collector of each light module, said common lens being configured to form on the road an image of the reflective surface of the collector of each light module.

According to the invention, the device comprises a plurality of printed circuits, each printed circuit supporting at least the light source of at least one of the light modules; the printed circuits are arranged in the lighting device in a stepped arrangement extending in planes that are substantially parallel to one another and the common lens extending in a transverse direction while being substantially inclined with respect to these planes.

Each light source may be arranged opposite the collector, in such a way that the reflective surface of said collector collects and reflects the light beam emitted by said corresponding light source. Thus, each light module is arranged to emit said light beam emitted by its light source, and reflected by its collector, toward said common lens in an overall direction of emission. This overall direction of emission preferably corresponds to the direction of the optical axis of the lighting device. Where appropriate, the light modules are arranged such that said overall directions of emission are parallel to one another, and said common lens extends in the transverse direction substantially perpendicular to these overall directions of emission, and where appropriate, substantially perpendicular to the direction of the optical axis of the lighting device.

Each light source is advantageously of semiconductor type, in the present case a light-emitting diode.

In one embodiment, the lighting device herein is an overall lighting module which comprises the plurality of light modules and which is intended to be mounted in a headlamp.

Preferably, the printed circuits are stepped in a vertical direction, perpendicular to the planes in which the printed circuits lie. Preferably, the planes in which the printed circuits lie extend at least in the transverse direction. Advantageously, the planes in which the printed circuits lie extend in the transverse direction and in a longitudinal direction, the longitudinal direction being perpendicular to the transverse direction and to the vertical direction. Preferably, the longitudinal direction corresponds to the overall direction of emission or to the direction of the optical axis of the lighting device.

Advantageously, the printed circuits are arranged in a stepped arrangement in such a way as to be transversely adjacent. Each printed circuit is arranged to support at least one light source.

Also advantageously, each light module is associated with a projection lens intended to form on the road an image of the reflective surface of the collector of the light module with which it is associated, and the common lens comprises the projection lenses of each module. Thus, the common lens is formed at least in part by the juxtaposition of the projection lenses of each light module.

According to a variant, a light module may comprise several light sources, several collectors each comprising a reflective surface, each collector being associated with at least one light source, and a single projection lens, the projection lens of the light module being intended to form on the road an image of the reflective surface of each collector of the light module.

Advantageously, the projection lens of each light module comprises an inner face, arranged facing the collector or collectors, intended to receive the light beam reflected by the collector of the corresponding light module, and an outer face, opposite the inner face, and via which the light beam is intended to be sent onto the road. The common lens thus comprises an inner face arranged facing the collectors and comprising the inner face of each light module and an outer face, opposite the inner face, and comprising the outer face of the projection lens of each light module.

For example, the outer face of the common lens is continuous. Thus, when the common lens is observed from the side of its output face, the common lens appears to form only a single lens.

Preferably, the inner face of the common lens is discontinuous, the inner face of each light module being joined to one another in a discontinuous manner Thus, the inner face of the projection lens of each light module is dedicated to this light module and makes it possible to shape the light beam reflected by the collector or collectors of the light module. The common lens thus makes it possible to independently shape the light beam reflected from each light module.

Advantageously, "common lens" is understood to mean projection optics produced in a single piece.

By virtue of the invention, it is thus possible to perform light functions allowing uniform lighting without loss of luminosity while using a lens with a significant vertical inclination, for example an inclination obtained by rotating the lens about the optical axis of the lighting device, making it possible to adapt to the esthetics of the motor vehicle comprising the lighting device.

Advantageously, the projection lenses of each light module are juxtaposed in a direction of juxtaposition. The direction of juxtaposition of the projection lenses of the light modules is inclined with respect to the transverse direction. In this example, the inclination of the common lens is defined by the inclination of the direction of juxtaposition.

Advantageously, the collector of each light module has a rear edge and the common lens has a focal region located in the vicinity of the rear edges of the collectors of the light modules such that the image of each collector formed by the common lens has an upper cut-off formed by the rear edge of this collector. What is notably meant by a focal region located in the vicinity of the rear edges of the collectors is a focal region that is located at a distance of less than 10 mm from said rear edges.

Advantageously, the projection lens of each light module has a focal region located in the vicinity of the rear edge of the collector of this light module such that the image of the collector formed by the projection lens of each light module has an upper cut-off formed by the rear edge of this collector. What is notably meant by a focal region located in the vicinity of the rear edges of the collectors is a focal region that is located at a distance of less than 10 mm from said rear edges.

In particular, the focal region of the common lens may be formed by the focal region of each projection lens. For example, the focal region of the common lens has several stepped focal regions, each focal region corresponding to the focal region of one of the light modules. The image of each collector formed by the common lens may be formed by superimposing the images of the collectors formed by the projection lenses of the light modules.

In general, the focal region of a projection lens may be a focal spot, also called a focal point, for example when the light module with which the lens is associated comprises a single collector, or may be a focal line, also called a focal point line, for example when the light module with which the lens is associated comprises a plurality of collectors.

For each section of the common lens through a plane substantially orthogonal to said planes that are substantially parallel to one another, the common lens has a height. This height corresponds to the actual height of the common lens. The "actual height" means the height that the common lens has when it is integrated in the lighting device.

In one example, the projection lens of each light module is formed by a portion of a lens. For example, the lens portion forming the projection lens is a lower portion of the lens, located below the center of the lens, or an upper portion of the lens, located above the center of the lens.

Preferably, the common lens has a central plane splitting it, over its entire length in said transverse direction, into two portions of substantially identical height. In other words, the common lens has a central plane passing through the center of the height of the common lens over its entire length in said transverse direction.

Preferably, the collector of each light module is arranged to focus said light beam emitted by the light source of this light module at a point on this central plane.

Preferably, said height may be substantially constant over the entire length of the common lens in said transverse direction.

Preferably, each collector comprises a secondary focal point arranged substantially on the central plane, the primary focal point being on the light source.

Advantageously, the common lens is arranged to project each light beam reflected by its collector, in an overall direction of projection, the rear edge of the collector of at least one of the light modules being offset with respect to said central plane in a third direction perpendicular to the overall direction of projection and to the transverse direction.

In particular, each projection lens is arranged to project the light beam reflected by the collector of its light module, in an overall direction of projection, the rear edge of the collector of at least one of the light modules being offset with respect to said central plane in a third direction perpendicular to the overall direction of projection and to the transverse direction.

For example, the third direction corresponds to the vertical direction, perpendicular to the planes in which the printed circuits lie.

For example, for each section of the common lens through a plane substantially orthogonal to said planes that are substantially parallel to one another, the light beam reflected by the reflective surface of the collector may pass through the center of the height of the common lens in this section.

For example, the focal region of at least one light module is offset, in a plane substantially orthogonal to said planes that are substantially parallel to one another, with respect to the center of the height of the common lens.

Advantageously, for each light module, the distance between the central plane and the rear edge of the collector of this light module, measured in the third direction, is less than the height of the common lens in line with this light module. The height of the common lens is also measured in the third direction.

For example, the distance between the central plane and the rear edge of the collector in the third direction may be determined in a section plane extending in the overall direction of projection, said section plane being substantially orthogonal to said planes that are substantially parallel to one another. Said distance is measured, in the third direction, between the point representing the rear edge of the collector and a central line which results from the intersection between the section plane and the central plane.

Advantageously, at least one printed circuit supports the light source of at least two light modules. Where appropriate, the common lens extends, in line with these light modules, in the transverse direction while being substantially inclined with respect to the plane in which this printed circuit extends, by an angle of less than 10°. Where appropriate, the light modules may thus be arranged on a transverse line in such a way as to be adjacent at least in pairs.

Advantageously, at least one printed circuit supports the light source of at least two light modules. Where appropriate, the projection lenses of each of these two light modules are juxtaposed in a direction of juxtaposition substantially inclined with respect to the transverse direction by an angle of less than 10°. The common lens comprising the projection lenses of the light modules is thus inclined with respect to the transverse direction by an angle of less than 10°.

In this example, said printed circuit supporting the light source of at least two light modules may be associated with at least two projection lenses. This embodiment thus makes it possible to group together several light modules on the same printed circuit, which thus ensures that the collectors of these modules are correctly aligned with said common lens.

Advantageously, at least one printed circuit only supports the light source of a single light module. Where appropriate, the common lens extends, in line with this light module, in the transverse direction while being substantially inclined with respect to the plane in which this printed circuit extends, by an angle of greater than 10°.

In this embodiment, said printed circuit that only supports the light source of a single light module is associated with a single projection lens. This embodiment thus allows inclination of the common lens by juxtaposing the projection lenses of each light module in an inclined direction of juxtaposition, while associating a single light module with a printed circuit.

Advantageously, the collector of each light module has, in section through a plane substantially orthogonal to the plane in which extends the printed circuit supporting the light source of this light module, a substantially elliptical profile, and in section through a plane substantially parallel to the plane in which extends the printed circuit supporting the light source of this light module, a substantially elliptical profile. Alternatively, the collector of each light module may have, in section through a plane substantially parallel to the plane in which extends the printed circuit supporting the light source of this light module, a substantially parabolic profile. Also alternatively, the collector of each light module may be a collector with a free surface (also referred to as free-form or free-shape).

Advantageously, the collectors have a truncated parabolic profile each defining a cavity in which the light source and the printed circuit are arranged.

Advantageously, the overall light beam formed by the projection, by the common lens, of the light beams reflected by the collectors of each of the light modules forms a wide light beam with a flat horizontal upper cut-off or a narrow light beam with a kinked horizontal upper cut-off, or a light beam of statutory low beam type.

BRIEF DESCRIPTION OF DRAWINGS

Other advantages and features of the present invention will now be described using examples that are purely illustrative and by no means limit the scope of the invention, and on the basis of the accompanying drawings, in which the various figures show.

In the following description, elements which are identical in structure or in function and appear in various figures keep the same reference sign, unless otherwise stated.

DETAILED DESCRIPTION OF THE INVENTION

Figure 1:
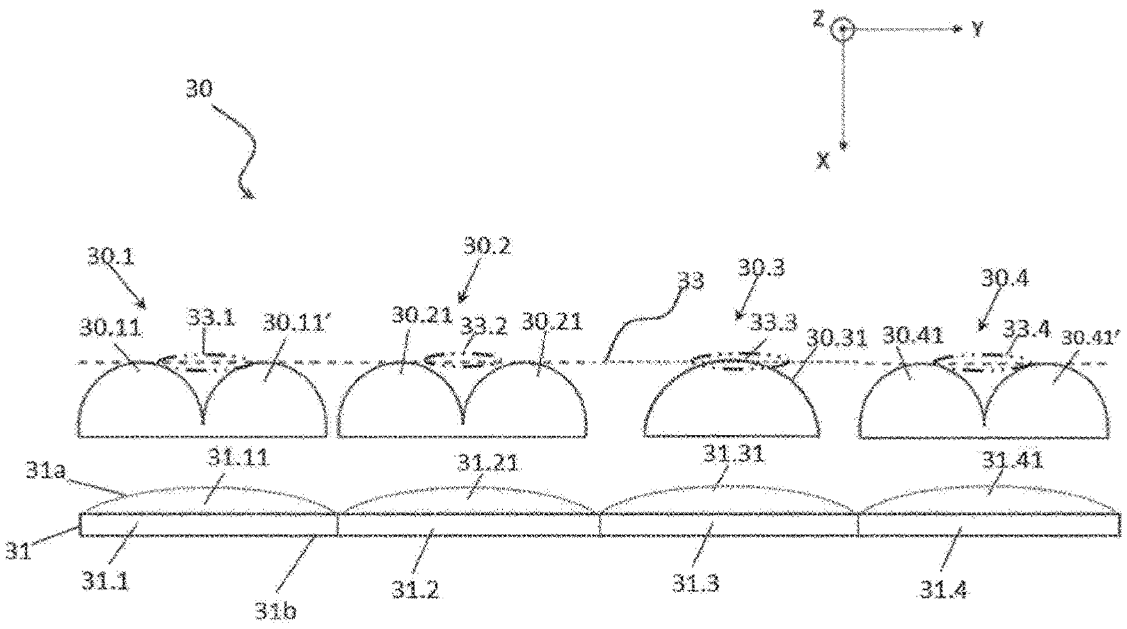
FIG. 1 schematically and partially depicts a view from the top of the lighting device according to one embodiment of the invention.
Figure 2:
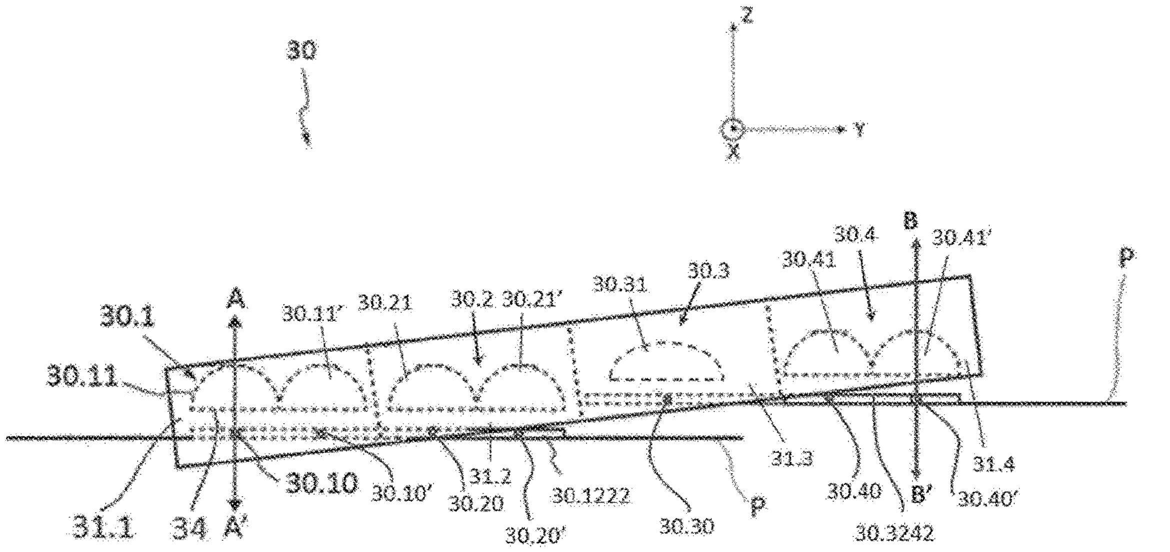
FIG. 2 schematically and partially depicts an end-on view of the lighting device according to one embodiment of the invention.
Figure 3:
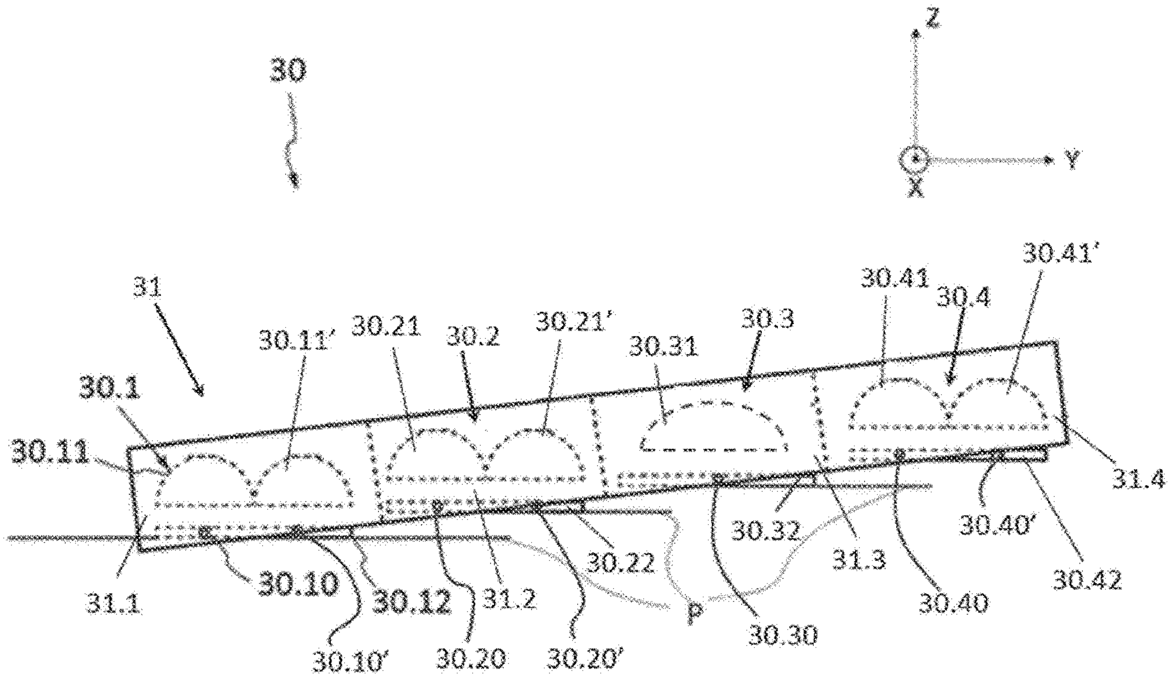
FIG. 3 schematically and partially depicts an end-on view of a lighting device according to another embodiment of the invention.
Figure 4:
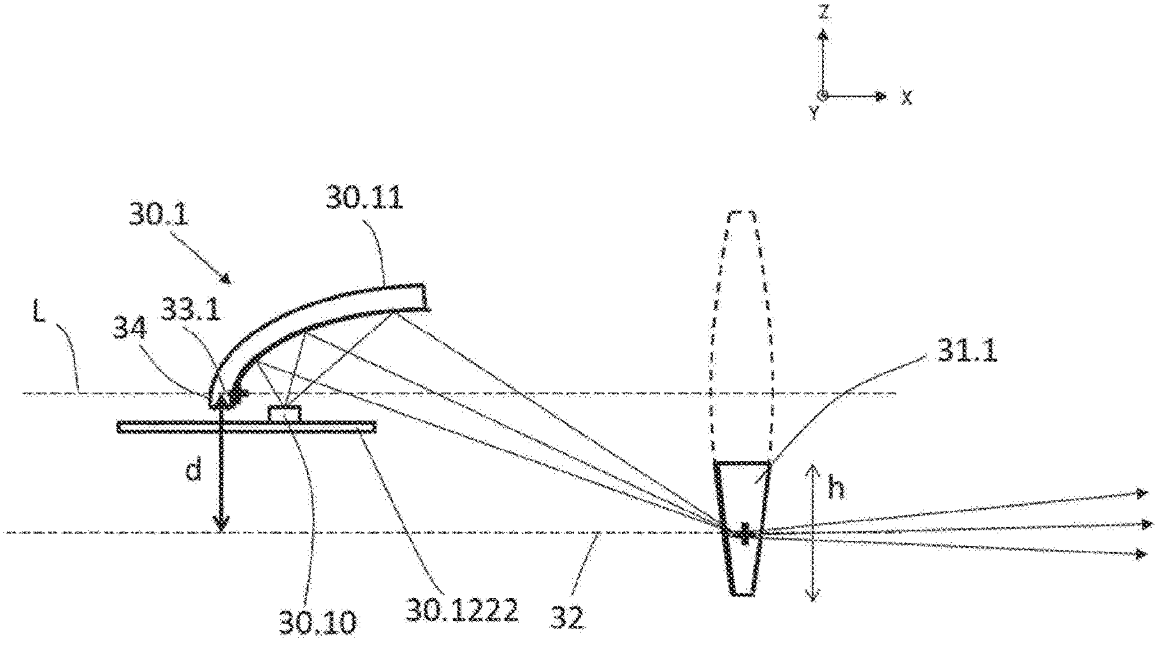
FIG. 4 schematically and partially depicts a view in cross section along the axis A-A' of the lighting device according to the embodiment of the invention shown in FIG. 2.
Figure 5:
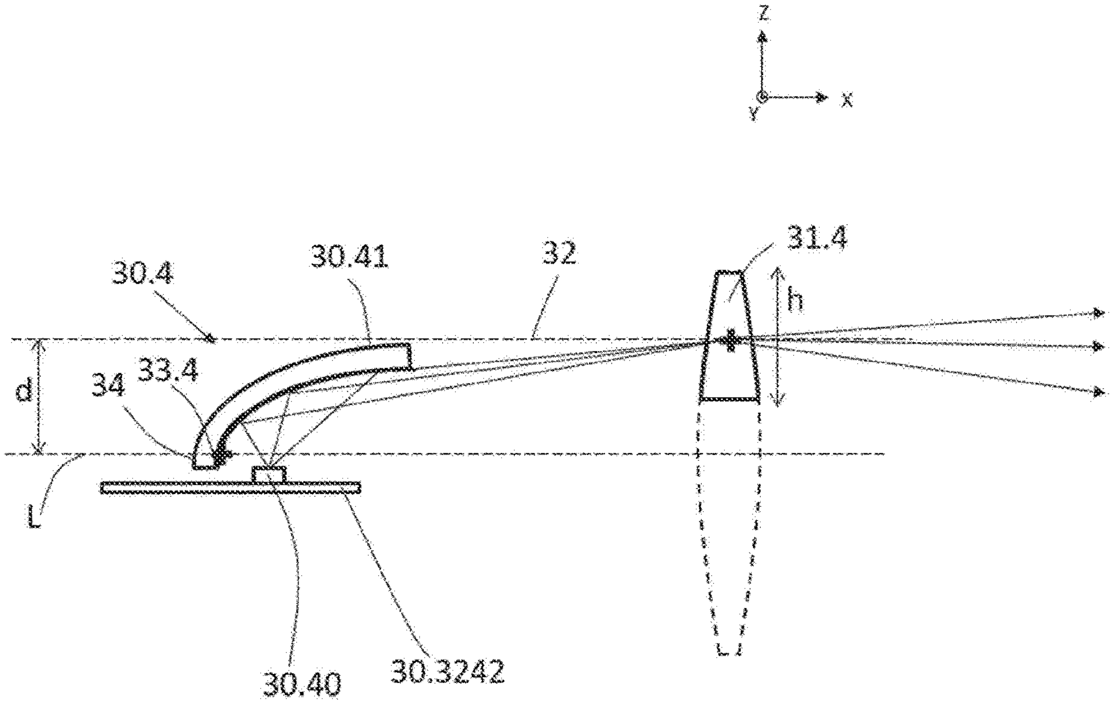
FIG. 5 schematically and partially depicts a view in cross section along the axis B-B' of the lighting device according to the embodiment of the invention shown in FIG. 2.

FIG. 1 depicts a motor vehicle lighting device 30 according to one embodiment of the invention. This lighting device 30 will be described in connection with FIG. 2, FIG. 3, FIG. 4, and FIG. 5. In particular, FIG. 2 illustrates, in an end-on view, an embodiment of the invention and FIG. 4 and FIG. 5 show, respectively, a section along the axis A-A' and along the axis B-B' in said embodiment. FIG. 3 illustrates, in an end-on view, another embodiment of the invention.

These figures depict an orthogonal reference system associated with the lighting device 30. This reference system is composed of three axes X, Y and Z referred to, herein, as the longitudinal axis X, the transverse axis Y and the vertical axis Z, respectively.

The lighting device 30 comprises a plurality of light modules 30.1, 30.2, 30.3, 30.4 and has on its front face a common lens 31 which is common to the plurality of light modules 30.1, 30.2, 30.3, 30.4. The number of light models shown is not limiting. The lighting device may comprise two or three light modules, or more than four light modules.

The light modules 30.1, 30.2, 30.3, 30.4 are arranged adjacent to one another in a transverse direction of the lighting device 30. Each of the light modules 30.1, 30.2, 30.4 comprises two light sources 30.10, 30.10', 30.20, 30.20', 30.40, 30.40' each emitting a light beam and two collectors 30.11, 30.11', 30.21, 30.21', 30.41, 30.41' each comprising a reflective surface. Each collector 30.11, 30.11', 30.21, 30.21', 30.41, 30.41' is associated with at least one light source 30.10, 30.10', 30.20, 30.20', 30.40, 30.40' and the reflective surface of each collector 30.11, 30.11', 30.21, 30.21', 30.41, 30.41' is configured to collect and reflect the light rays emitted by the light source 30.10, 30.10', 30.20, 30.20', 30.40, 30.40' with which it is associated.

The light module 30.3 differs from the other light modules in that it comprises a single light source 30.30 emitting a light beam and a single collector 30.31, associated with the light source 30.30 and comprising a reflective surface configured to collect and reflect the light rays emitted by the light source 30.30.

The overall light beam formed by the projection, by the common lens 31, of the light beams reflected by the collectors 30.11, 30.11', 30.21, 30.21', 30.31, 30.41, 30.41' of each of the light modules 30.1, 30.2, 30.3, 30.4 forms a wide light beam with a flat horizontal upper cut-off or a narrow light beam with a kinked horizontal upper cut-off, or a light beam of statutory low beam type.

Each of the collectors 30.11, 30.11', 30.21, 30.21', 30.31, 30.41, 30.41' has a truncated parabolic profile each defining a cavity in which the light source 30.10, 30.10', 30.20, 30.20', 30.30, 30.40, 30.40' is arranged.

Each collector 30.11, 30.11', 30.21, 30.21', 30.31, 30.41, 30.41' is configured such that it collects the light beam emitted by the light source 30.10, 30.10', 30.20, 30.20', 30.30, 30.40, 30.40' with which it is associated and such that it reflects same toward the common lens 31 in an overall direction of emission extending in this case along the longitudinal axis X. In particular, each light module 30.1, 30.2, 30.3, 30.4 comprises a projection lens 31.1, 31.2, 31.3,

31.4 intended to form on the road an image of the reflective surface of the collectors 30.11, 30.11', 30.21, 30.21', 30.31, 30.41, 30.41' of the light module 30.1, 30.2, 30.3, 30.4 with which it is associated, and the common lens 31 is formed by the juxtaposition of the projection lenses 31.1, 31.2, 31.3, 31.4 of the light modules 30.1, 30.2, 30.3, 30.4.

In the context of the invention, the number of light sources and collectors present in each light module may vary. According to one alternative, illustrated by the light module 30.3, a light module may comprise a single light source and a single collector associated with a single projection lens. According to another alternative, illustrated by the light modules 30.1, 30.2, 30.4, a light module may comprise two light sources and two collectors associated with a single projection lens. According to yet another alternative, a light module may comprise more than two light sources and/or more than two collectors, associated with a single projection lens. Each light module is thus defined by its projection lens, and comprises the collector or collectors the image of the reflective surface of which is formed by the projection lens, together with the light sources associated with these collectors.

Each collector 30.11, 30.11', 30.21, 30.21', 30.31, 30.41, 30.41' of each light module 30.1, 30.2, 30.3, 30.4 has a rear edge 34 such that the image of each collector 30.11, 30.11', 30.21, 30.21', 30.31, 30.41, 30.41' formed by the projection lens 31.1, 31.2, 31.3, 31.4 with which it is associated, and therefore by the common lens 31, has an upper cut-off formed by the rear edge 34 of each said collector 30.11, 30.11', 30.21, 30.21', 30.31, 30.41, 30.41'.

Each light source 30.10, 30.10', 30.20, 30.20', 30.30, 30.40, 30.40' may be arranged opposite the collector 30.11, 30.11', 30.21, 30.21', 30.31, 30.41, 30.41' with which it is associated, in such a way that the reflective surface of said collector collects and reflects the light beam emitted by said corresponding light source. Thus, each light module 30.1, 30.2, 30.3, 30.4 is arranged to emit said light beams emitted by its light sources, and reflected by its collectors, toward said common lens 31 in a mutually parallel overall direction of emission. This overall direction of emission corresponds to the direction of the optical axis of the lighting device.

The common lens 31 is arranged to project the light beams emitted by each light source 30.10, 30.10', 30.20, 30.20', 30.30, 30.40, 30.40' of each light module 30.1, 30.2, 30.3, 30.4 and reflected by the collectors 30.11, 30.11', 30.21, 30.21', 30.31, 30.41, 30.41' in the overall direction of projection. In particular, each projection lens 31.1, 31.2, 31.3, 31.4 is arranged to project the light beams emitted by each light source 30.10, 30.10', 30.20, 30.20', 30.30, 30.40, 30.40' of the light module 30.1, 30.2, 30.3, 30.4 with which it is associated, and reflected by the collectors 30.11, 30.11', 30.21, 30.21', 30.31, 30.41, 30.41' of this light module 30.1, 30.2, 30.3, 30.4 in the overall direction of projection.

The projection lens 31.1, 31.2, 31.3, 31.4 of each light module 30.1, 30.2, 30.3, 30.4 comprises an inner face 31.11, 31.21, 31.31, 31.41 arranged facing the collector or collectors 30.11, 30.11', 30.21, 30.21', 30.31, 30.41, 30.41' of the light module 30.1, 30.2, 30.3, 30.4. Each inner face 31.11, 31.21, 31.31, 31.41 is intended to receive the light beam reflected by the collector 30.11, 30.11', 30.21, 30.21', 30.31, 30.41, 30.41' of the corresponding light module 30.1, 30.2, 30.3, 30.4. The projection lens 31.1, 31.2, 31.3, 31.4 of each light module 30.1, 30.2, 30.3, 30.4 also comprises an outer face, opposite the inner face 31.11, 31.21, 31.31, 31.41, and via which the light beam is intended to be sent onto the road.

The common lens 31 thus comprises an inner face 31*a* arranged facing the collectors 30.11, 30.11', 30.21, 30.21', 30.31, 30.41, 30.41' and comprising the inner face 31.11, 31.21, 31.31, 31.41 of each light module 30.1, 30.2, 30.3, 30.4 and an outer face 31*b*, opposite the inner face 31*a*, and comprising the outer face of the projection lens 31.1, 31.2, 31.3, 31.4 of each light module 30.1, 30.2, 30.3, 30.4. The outer face 31*b* of the common lens 31 is continuous. Thus, when the common lens 31 is observed from the side of its output face 31*b*, the common lens 31 appears to form only a single lens.

The inner face 31*a* of the common lens 31 is discontinuous, the inner face 31.11, 31.21, 31.31, 31.41 of the projection lens 31.1, 31.2, 31.3, 31.4 of each light module 30.1, 30.2, 30.3, 30.4 being joined to one another in a discontinuous manner. Thus, the inner face 31.11, 31.21, 31.31, 31.41 of the projection lens 31.1, 31.2, 31.3, 31.4 of each light module 30.1, 30.2, 30.3, 30.4 is dedicated to this light module 30.1, 30.2, 30.3, 30.4 and makes it possible to shape the light beam reflected by the collector or collectors 30.11, 30.11', 30.21, 30.21', 30.31, 30.41, 30.41' of the light module 30.1, 30.2, 30.3, 30.4. The common lens 31 thus makes it possible to independently shape the light beam reflected from each light module 30.1, 30.2, 30.3, 30.4.

The common lens 31 has a focal region, shown in this case in FIG. 1 in the form of a focal point line 33 located in the vicinity of the rear edges of the collectors 30.11, 30.11', 30.21, 30.21', 30.31, 30.41, 30.41', said focal point line 33 being located at a distance of less than 10 mm from the rear edges of said collectors 30.11, 30.11', 30.21, 30.21', 30.31, 30.41, 30.41'.

More precisely, the projection lens 31.1, 31.2, 31.3, 31.4 of each light module 30.1, 30.2, 30.3, 30.4 has a focal region 33.1, 33.2, 33.3, 33.4 located in the vicinity of the rear edge 34 of the collectors 30.11, 30.11', 30.21, 30.21', 30.31, 30.41, 30.41' of this light module 30.1, 30.2, 30.3, 30.4 such that the image of the collector 30.11, 30.11', 30.21, 30.21', 30.31, 30.41, 30.41' formed by the projection lens 31.1, 31.2, 31.3, 31.4 of each light module 30.1, 30.2, 30.3, 30.4 has an upper cut-off formed by the rear edge 34 of these collectors 30.11, 30.11', 30.21, 30.21', 30.31, 30.41, 30.41'. What is notably meant by a focal region located in the vicinity of the rear edges of the collectors is a focal region that is located at a distance of less than 10 mm from said rear edges. The focal region 33.1, 33.2, 33.3, 33.4 of the projection lenses 31.1, 31.2, 31.3, 31.4 may be a focal line or focal spot.

The focal region 33 of the common lens 31 is thus formed by the focal region 33.1, 33.2, 33.3, 33.4 of each projection lens 31.1, 31.2, 31.3, 31.4. It thus has several stepped focal regions 33.1, 33.2, 33.3, 33.4, each corresponding to the focal region 33.1, 33.2, 33.3, 33.4 of one of the light modules 30.1, 30.2, 30.3, 30.4. The focal point line 33 shown in FIG. 1 corresponds to the line joining the focal regions 33.1, 33.2, 33.3, 33.4 of each projection lens 31.1, 31.2, 31.3, 31.4 when they are projected in a horizontal plane defined by the transverse and longitudinal directions, corresponding to the plane depicted in FIG. 1.

The lighting device 30 also comprises printed circuits, each printed circuit supporting at least the light source of at least one of the light modules. The printed circuits are arranged in line with the cavities in which the light sources 30.10, 30.10', 30.20, 30.20', 30.30, 30.40, 30.40' are arranged.

According to an embodiment shown in FIG. 2, the light sources 30.10, 30.10', 30.20, 30.20' of the light modules 30.1, 30.2 are arranged on the same printed circuit 30.1222, and the light sources 30.30, 30.40, 30.40' of the light modules 30.3, 30.4 are arranged on the same printed circuit 30.3242. Each printed circuit 30.1222, 30.3242 thus supports the light source 30.10, 30.10', 30.20, 30.20', 30.30, 30.40, 30.40' of two light modules 30.1, 30.2, 30.3, 30.4 and is associated with two projection lenses 31.1, 31.2, 31.3, 31.4.

The light modules 30.1, 30.2, 30.3, 30.4 may thus be arranged on a transverse line in such a way as to be adjacent at least in pairs. Said printed circuit 30.1222, 30.3242 supporting the light source 30.10, 30.10', 30.20, 30.20', 30.30, 30.40, 30.40' of at least two light modules may be associated with at least two projection lenses 31.1, 31.2, 31.3, 31.4. This embodiment thus makes it possible to group together several light modules on the same printed circuit, which thus ensures that the collectors of these light modules are correctly aligned with said common lens 31.

According to another embodiment shown in FIG. 3, the light sources 30.10, 30.10', 30.20, 30.20', 30.30, 30.40, 30.40' of each light module 30.1, 30.2, 30.3, 30.4 are each arranged on a single printed circuit 30.12, 30.22, 30.32, 30.42. In other words, the light sources 30.10, 30.10' of the light module 30.1 are arranged on the printed circuit 30.12, the light sources 30.20, 30.20' of the light module 30.2 are arranged on the printed circuit 30.22, the light source 30.30 of the light module 30.3 is arranged on the printed circuit 30.32 and the light sources 30.40, 30.40' of the light module 30.4 are arranged on the printed circuit 30.42.

Each printed circuit 30.12, 30.22, 30.32, 30.42 only supports the light source of a single light module, and is associated with a single projection lens 31.1, 31.2, 31.3, 31.4.

In each of these embodiments, the printed circuits 30.12, 30.22, 30.32, 30.42, 30.1222, 30.3242 are arranged adjacent to one another transversely and in a stepped arrangement, each printed circuit extending in a plane P, said planes being parallel to one another and referred to below as substantially parallel planes P. In the example illustrated, the printed circuits 30.12, 30.22, 30.32, 30.42, 30.1222, 30.3242 are stepped in the vertical direction. This vertical direction is perpendicular to said substantially parallel planes P.

With reference to FIG. 4 and FIG. 5, in section through a plane substantially orthogonal to said planes P that are substantially parallel to one another, the common lens 31 has a height h. This height corresponds to the actual height of the common lens 31. To be specific, as can be seen in FIGS. 4 and 5, the projection lenses 31.1, 31.4 forming the common lens 31 correspond to lens portions. These lenses have been shown in dotted lines, and the portions of these lenses corresponding to the projection lenses 31.1, 31.4 have been shown in solid lines. The lenses from which the projection lenses 31.1, 31.4 originate are centered on the longitudinal axis L passing through the focal region 33.1, 33.4. The same configuration applies to the light modules 30.2, 30.3, and in particular to the projection lenses 31.2, 31.3.

A central plane 32 splits the common lens 31, over its entire length in said transverse direction Y, into two portions of substantially identical height. The height h of the common lens 31 is substantially constant over the entire length of the common lens 31 in the transverse direction.

The collector 30.11, 30.11', 30.21, 30.21', 30.31, 30.41, 30.41' of each light module 30.1, 30.2, 30.3, 30.4 comprises a primary focal point on the light source 30.10, 30.10', 30.20, 30.20', 30.30, 30.40, 30.40' and a secondary focal point arranged substantially on the central plane 32. The collector 30.11, 30.11', 30.21, 30.21', 30.31, 30.41, 30.41' of each light module 30.1, 30.2, 30.3, 30.4 focuses the light beam emitted by the associated light source 30.10, 30.10', 30.20, 30.20', 30.30, 30.40, 30.40' on a point in this central plane 32. More specifically, the collector 30.11, 30.11', 30.21, 30.21', 30.31, 30.41, 30.41' of each light module 30.1, 30.2, 30.3, 30.4 focuses the light beam emitted by the associated light source 30.10, 30.10', 30.20, 30.20', 30.30, 30.40, 30.40' on the central plane 32, on the projection lens 31.1, 31.2, 31.3, 31.4 of the light module 30.1, 30.2, 30.3, 30.4. In the example illustrated, the light beam is focused in the central plane 32, at the center of the projection lens 31.1, 31.2, 31.3, 31.4. Alternatively, it could be focused in the central plane 32, on the inner face 31.11, 31.21, 31.31, 31.41 of the projection lens 31.1, 31.2, 31.3, 31.4.

The common lens 31 extends in a transverse direction Y substantially perpendicular to the overall direction of emission of the light beams, being substantially inclined with respect to the planes containing the printed circuits 30.12, 30.22, 30.32, 30.42, 30.1222, 30.3242. Each projection lens 31.1, 31.2, 31.3, 31.4 forming the common lens 31 passes through a plane substantially orthogonal to the substantially parallel planes P comprising the printed circuits 30.12, 30.22, 30.32, 30.42, 30.1222, 30.3242. The projection lenses 31.1, 31.2, 31.3, 31.4 of each light module 30.1, 30.2, 30.3, 30.4 are juxtaposed in a direction of juxtaposition. The direction of juxtaposition of the projection lenses 31.1, 31.2, 31.3, 31.4 of the light modules 30.1, 30.2, 30.3, 30.4 is inclined with respect to the transverse direction. In this example, the inclination of the common lens 31 is defined by the inclination of the direction of juxtaposition.

In FIG. 3, the inclination of the common lens 31 is greater than in the embodiment described in FIG. 2, FIG. 4 and FIG. 5, which leads to a subdivision of the printed circuits 30.12, 30.22, 30.32, 30.42. The subdivision is necessary to respect the offset between each light module and the corresponding common lens 31.

The common lens 31 extends in the horizontal direction Y while being substantially inclined with respect to the light modules 30.1, 30.2, 30.3, 30.4 and in particular with respect to the line on which these light modules 30.1, 30.2, 30.3, 30.4 are arranged.

It can thus be seen in FIG. 2 that the light module 30.1 is arranged above the central plane 32 of the common lens 31 and the module 30.4 is arranged below the central plane 32 of the common lens 31. In this case, the offset of the light modules 30.1 and 30.4 with respect to the central plane 32 is exaggerated for the visual depiction in FIGS. 4 and 5. Note that the light modules 30.2, 30.3 are also offset with respect to the central plane 32.

Specifically, FIG. 4 shows the view in cross section of the lighting device along a section plane passing through the axis A-A' shown in FIG. 2. This section plane extends parallel to the overall direction of projection X while being substantially orthogonal to the parallel planes P. In this view in cross section, the point representing the rear edge 34 of the light module 30.1 is offset with respect to a central line which results from the intersection between the section plane and the central plane 32 along the vertical axis Z. In this case, the rear edge 34 is located above the central line. This offset is characterized by the distance d measured along the vertical axis Z between the rear edge 34 and the central line. The focal region 33.1 of the projection lens 31.1 associated with the light module 30.1 is thus offset with respect to the central line.

Likewise, FIG. 5 shows a view in cross section of the lighting device along a section plane passing through the axis B-B' shown in FIG. 2. In FIG. 5, there is also an offset between the rear edge 34 and the central line forming part of the central plane 32 along the vertical axis Z. This offset is also characterized by the distance d measured between the rear edge 34 of the light module 30.4 and the central line. In this case, the rear edge of the light module 30.4 is located below the central line. The focal region 33.4 of the projection lens 31.4 associated with the light module 30.4 is thus offset with respect to the central line.

In both cases, the distance d is less than the height h of the lens measured along the vertical axis Z.

In FIG. 3, the light modules 30.1, 30.2, 30.3, 30.4 are also offset with respect to the central plane 32 of the common lens. The description of the position of the collectors with respect to the common lens in connection with FIGS. 4 and 5 also applies to the collectors and to the common lens of the light modules of FIG. 3.

The above description clearly explains how the invention makes it possible to achieve its aims, namely to perform light functions allowing uniform lighting without loss of luminosity while using a lens with a significant vertical inclination adapted to the esthetics of the motor vehicle comprising the lighting device. To this end, the invention proposes the use of a plurality of printed circuits supporting at least one light source, arranged in a stepped arrangement extending in planes that are substantially parallel to one another, and a common lens extending in a transverse direction substantially inclined with respect to these planes.

In any event, the invention should not be regarded as being limited to the embodiments specifically described in this document, and extends, in particular, to any equivalent means and to any technically feasible combination of these means.

What is claimed is:

1. A motor vehicle lighting device for lighting the road, comprising:

a plurality of light modules arranged adjacent to one another in a transverse direction of the lighting device, each light module including a light source capable of emitting a light beam and a collector with a reflective surface configured to collect and reflect the light beam emitted by the light source;

a common lens which is common to the plurality of light modules, configured to project the light beam reflected by the collector of each light module, the common lens being configured to form on the road an image of the reflective surface of the collector of each light module; and a plurality of printed circuits, with each printed circuit supporting at least the light source of at least one of the light modules, with the printed circuits being arranged in the lighting device in a stepped arrangement extending in planes that are substantially parallel to one another and the common lens extending in the transverse direction while being substantially inclined with respect to these planes, where at least one of the plurality of printed circuits supports the light source of at least two light modules; and wherein the common lens extends, in line with these light modules, in the transverse direction while being substantially inclined with respect to the plane in which this printed circuit extends, by an angle of less than 10°.

2. The motor vehicle lighting device for lighting the road as claimed in claim 1, wherein each light module is associated with a projection lens intended to form on the road an image of the reflective surface of the collector of the light module with which it is associated, and the common lens includes the projection lenses of each module.

3. The motor vehicle lighting device for lighting the road as claimed in claim 2, wherein the projection lenses of each light module are juxtaposed in a direction of juxtaposition which is inclined with respect to the transverse direction.

4. The motor vehicle lighting device for lighting the road as claimed in claim 1, wherein the collector of each light module has a rear edge and wherein the common lens has a focal region located in the vicinity of the rear edges of the collectors of the light modules such that the image of each collector formed by the common lens has an upper cut-off formed by the rear edge of this collector.

5. The motor vehicle lighting device for lighting the road as claimed in claim 1, wherein the common lens has a central plane splitting it, over its entire length in the transverse direction, into two portions of substantially identical height, and wherein the collector of each light module is arranged to focus the light beam emitted by the light source of this light module at a point on this central plane.

6. The motor vehicle lighting device for lighting the road as claimed in claim 5, wherein the common lens is arranged to project each light beam reflected by its collector, in an overall direction of projection, and wherein the rear edge of the collector of at least one of the light modules is offset with respect to the central plane in a third direction perpendicular to the overall direction of projection and to the transverse direction.

7. The motor vehicle lighting device for lighting the road as claimed in claim 6, wherein for each light module, a distance between the central plane and the rear edge of the collector of this light module, measured in the third direction, is less than a height of the common lens in line with this light module.

8. The motor vehicle lighting device as claimed in claim 1, wherein at least one printed circuit only supports the light source of a single light module; and wherein the common lens extends, in line with this light module, in the transverse direction while being substantially inclined with respect to the plane in which this printed circuit extends, by an angle of greater than 10°.

9. The motor vehicle lighting device for lighting the road as claimed in claim 1, wherein the collector of each light module has, in a section through a plane substantially orthogonal to the plane in which extends the printed circuit supporting the light source of this light module, an elliptical profile, and in a section through a plane substantially parallel to the plane in which extends the printed circuit; supporting the light source of this light module, a substantially elliptical profile.

10. The motor vehicle lighting device as claimed in claim 1, wherein the overall light beam formed by the projection, by the common lens, of the light beams reflected by the collectors of each of the light modules forms a wide light beam with a horizontal upper cut-off or a narrow light beam with a kinked horizontal upper cut-off, or a light beam of statutory low beam type.

11. A motor vehicle lighting device for lighting the road, comprising:

a plurality of light modules arranged adjacent to one another in a transverse direction of the lighting device, each light module including a light source capable of emitting a light beam and a collector with a reflective surface configured to collect and reflect the light beam emitted by the light source;

a common lens which is common to the plurality of light modules, configured to project the light beam reflected by the collector of each light module, the common lens being configured to form on the road an image of the reflective surface of the collector of each light module, and the common lens has a central plane splitting it, over its entire length in the transverse direction, into two portions of substantially identical height, and wherein the collector of each light module is arranged to focus the light beam emitted by the light source of this light module at a point on this central plane; and a plurality of printed circuits, with each printed circuit supporting at least the light source of at least one of the light modules, with the printed circuits being arranged in the lighting device in a stepped arrangement extending in planes that are substantially parallel to one another and the common lens extending in the transverse direction while being substantially inclined with respect to these planes.

12. The motor vehicle lighting device for lighting the road as claimed in claim 11, wherein the common lens is arranged to project each light beam reflected by its collector, in an overall direction of projection, and wherein the rear edge of the collector of at least one of the light modules is offset with respect to the central plane in a third direction perpendicular to the overall direction of projection and to the transverse direction.

13. The motor vehicle lighting device for lighting the road as claimed in claim 12, wherein for each light module, a distance between the central plane and the rear edge of the collector of this light module, measured in the third direction, is less than a height of the common lens in line with this light module.

14. The motor vehicle lighting device for lighting the road as claimed in claim 11, wherein each light module is associated with a projection lens intended to form on the road an image of the reflective surface of the collector of the light module with which it is associated, and the common lens includes the projection lenses of each module.

15. The motor vehicle lighting device for lighting the road as claimed in claim 11, wherein the collector of each light module has a rear edge and wherein the common lens has a focal region located in the vicinity of the rear edges of the collectors of the light modules such that the image of each collector formed by the common lens has an upper cut-off formed by the rear edge of this collector.

16. A motor vehicle lighting device for lighting the road, comprising:

a plurality of light modules arranged adjacent to one another in a transverse direction of the lighting device, each light module including a light source capable of emitting a light beam and a collector with a reflective surface configured to collect and reflect the light beam emitted by the light source;

a common lens which is common to the plurality of light modules, configured to project the light beam reflected by the collector of each light module, the common lens being configured to form on the road an image of the reflective surface of the collector of each light module; and a plurality of printed circuits, with each printed circuit supporting at least the light source of at least one of the light modules, with the printed circuits being arranged in the lighting device in a stepped arrangement extending in planes that are substantially parallel to one another and the common lens extending in the transverse direction while being substantially inclined with respect to these planes, and at least one printed circuit only supports the light source of a single light module; and wherein the common lens extends, in line with this light module, in the transverse direction while being substantially inclined with respect to the plane in which this printed circuit extends, by an angle of greater than 10°.

17. The motor vehicle lighting device for lighting the road as claimed in claim 16, wherein the common lens has a central plane splitting it, over its entire length in the transverse direction, into two portions of substantially identical height, and wherein the collector of each light module is arranged to focus the light beam emitted by the light source of this light module at a point on this central plane.

18. The motor vehicle lighting device for lighting the road as claimed in claim 17, wherein the common lens is arranged to project each light beam reflected by its collector, in an overall direction of projection, and wherein the rear edge of the collector of at least one of the light modules is offset with respect to the central plane in a third direction perpendicular to the overall direction of projection and to the transverse direction.

19. The motor vehicle lighting device for lighting the road as claimed in claim 18, wherein for each light module, a distance between the central plane and the rear edge of the collector of this light module, measured in the third direction, is less than a height of the common lens in line with this light module.

20. The motor vehicle lighting device for lighting the road as claimed in claim 16, wherein the collector of each light module has a rear edge and wherein the common lens has a focal region located in the vicinity of the rear edges of the collectors of the light modules such that the image of each collector formed by the common lens has an upper cut-off formed by the rear edge of this collector.

* * * * *